B. W. KING.
SCALE.
APPLICATION FILED SEPT. 15, 1919.

1,384,136.

Patented July 12, 1921.
2 SHEETS—SHEET 1.

Inventor
Bert W. King

By Stuart E. Barnes
Attorney

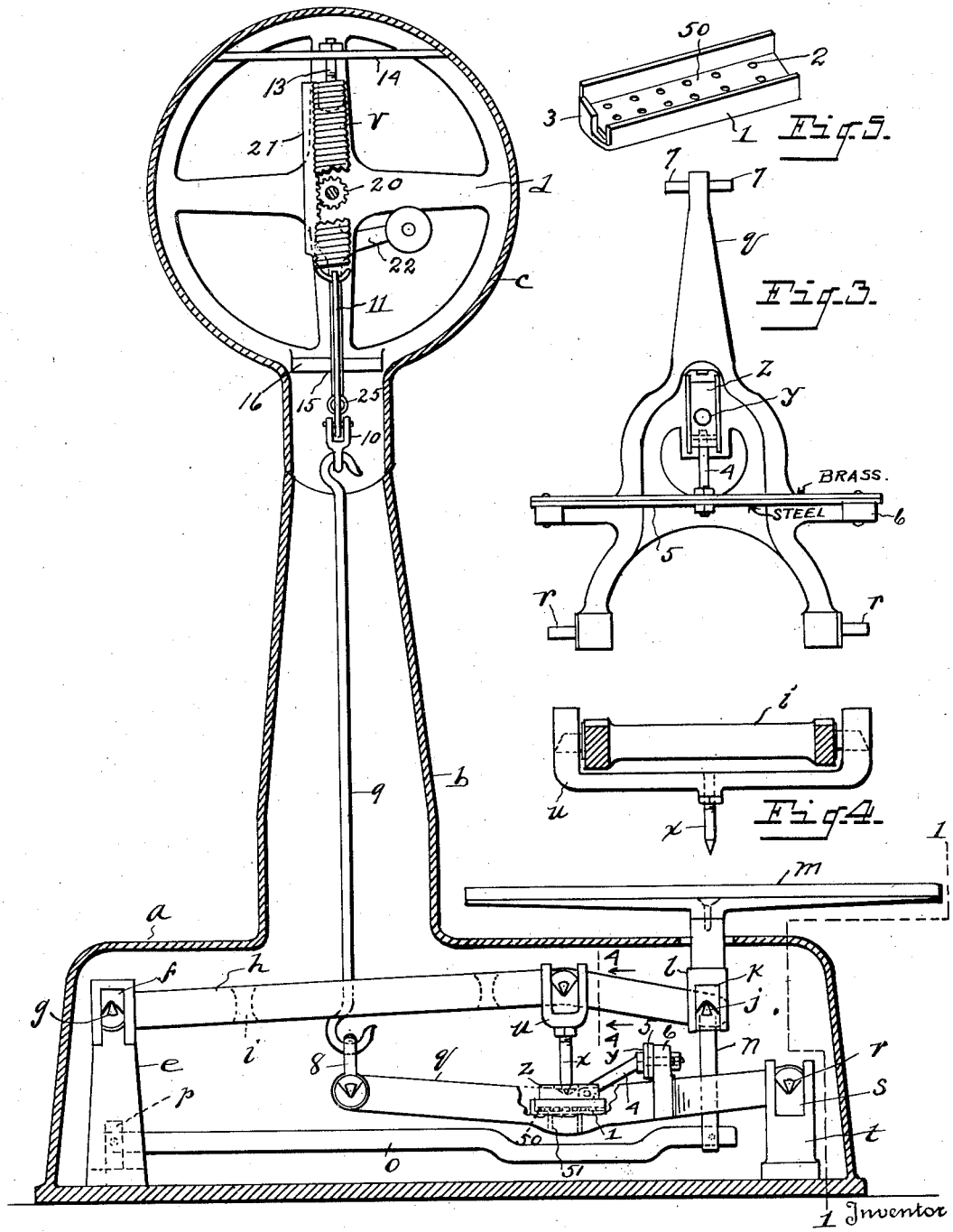

UNITED STATES PATENT OFFICE.

BERT W. KING, OF DETROIT, MICHIGAN.

SCALE.

1,384,136.  Specification of Letters Patent.  Patented July 12, 1921.

Application filed September 15, 1919. Serial No. 323,921.

*To all whom it may concern:*

Be it known that I, BERT W. KING, a citizen of the United States, residing at Detroit, in the county of Wayne and State of Michigan, have invented certain new and useful Improvements in Scales, of which the following is a specification.

This invention relates to scales, and has for its object a weighing scale provided with a special arrangement of levers in connection with a novel form of thermostat to compensate for varying lengths of the resisting spring due to climatic changes. These and other objects will be better understood when the apparatus is described in detail.

In the drawings,—

Fig. 2 is a vertical cross section of the scale taken on the line 2—2 of Fig. 1.

Fig. 3 is a plan view of the drum-operating lever.

Fig. 4 is a section taken on the line 4—4 of Fig. 2.

Fig. 5 is a detail of the thermostatic slide guide.

Figure 1:
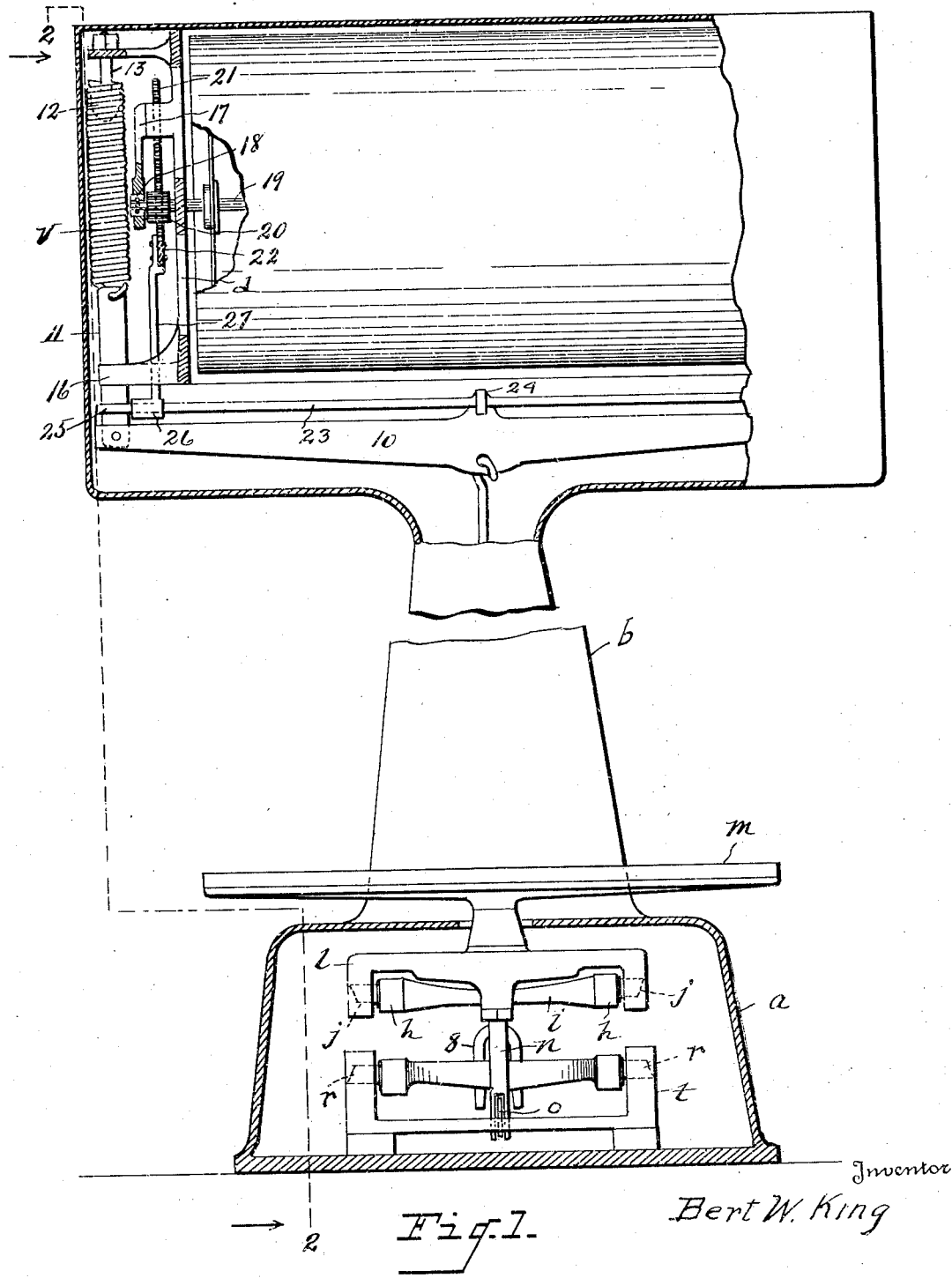
Figure 1 is a front elevation of the scale taken partly in section on the line 1—1 of Fig. 2, and part of the drum housing being broken away to show the drum-operating parts.

$a$ designates the hollow base of the scale; $b$ the hollow pedestal; $c$ the drum housing reinforced by the spider $d$. Within the base is a pair of posts $e$ which support the agate blocks $f$ which are adapted to receive the upwardly-thrusting knife edge $g$ of the pair of levers $h$ which are connected together by the cross bars $i$. These upper levers $h$ have at their opposite ends upwardly-facing knife edges $j$ which engage the agate blocks $k$ in the ends of the platform-supporting yoke $l$. This platform-supporting yoke $l$ supports a platform or goods-receiver $m$. From the center of the yoke a stem $n$ extends down and straddles the check lever $o$ which is pivoted thereto. This check lever $o$ is pivotally supported at the front of the base by the post $p$ in line with the knife edge bearing $g$ of the upper levers. The lower check lever and the stem $n$, which amounts to a link, form a system of parallel levers—the familiar arrangement in scales to maintain the goods-receiver in horizontal position.

Instead of making one of these parallel levers actuate the connecting rod that leads up through the hollow pedestal, which is a very common construction, I utilize a third lever as a drum-actuating lever. This lever is designated $q$ and is pivoted at the front of the scale, as contradistinguished from the parallel levers which are pivoted at the rear of the scale. This drum-actuating lever $q$ is shown in plan view in Fig. 3, and is roughly the shape of an A in plan view. At the front ends of the drum-actuating lever there are two knife edges $r$ which engage the agate bearings $s$ supported by the front posts $t$.

Between the upper parallel levers $h$ and the drum-actuating lever $q$, I employ a shiftable link or actuator $u$. The lower end of this link $u$ is automatically shifted in obedience to changes in temperature to compensate for elongation or contraction of the resisting spring $v$. This is effected by having a pointed stem $x$ attached to the center of the yoke-like upper half of this link, as shown in Fig. 4. The point of this stem $x$ projects into the conical pit $y$ in the slide $z$. This slide slides in the guide 1, detailed in Fig. 5, upon the balls 2 that are held by the ball retainer 50 in the guide by simply upsetting the metal slightly around the ball holes. This guide is formed by stamping a piece of metal up to form side flanges and an end flange 3. The guide is secured to the upper lever by the rivets 51. The slide pivotally connects with the rod 4 that is bolted to the thermostat 5. The thermostat comprises a pair of strips, one of steel and the other of brass, riveted to the vertical standards 6 that are part of the A-like drum-actuating lever $q$. Brass has a much higher coefficient of expansion than steel. Hence when it expands it causes the thermostat to buckle. The brass being on the rear side of the thermostat will, when the temperature rises, buckle rearwardly, forcing the rod 4 and the slide $z$ rearwardly. This slightly reduces the amount of throw of the drum-actuating lever $q$ with a given movement of the platform. It will be obvious that the farther toward the free end of the lever $q$ the actuating link $x$ engages, the less the throw. The amount of movement is nicely calculated as near as can be to compensate for variation in the spring due to thermal changes. Hence this is a very effective and accurate thermostatic regulator operating by changing the actuating point on the drum-actuating lever. So far as I am aware a thermostat has not been heretofore used in the lever mechanism itself. The thermostat has been arranged to act either between the lever and the drum pull rod or else somewhere in the drum housing.

The arrangement of levers that I have described lends itself nicely to the interposition of a thermostat between the parallel levers and the drum-actuating lever because the drum-actuating lever is a separate lever and the alteration of the point of application of the load does not affect the operation of the machine as would be the case if an attempt were made to alter the point of application of the load on one of the levers of a set of parallel levers. This arrangement of parallel levers and the separate drum-actuating lever has obvious advantages also in permitting a large multiplication of the movement of the platform in the movement of the drum, if this is desired. Furthermore, it has a very decided advantage in allowing the pedestal b to be built nearer the middle of the base and get all the desired multiplication of movement from platform to drum. This is very advantageous as it is a serious hindrance in some cases to have the pedestal at the extreme back of the base as so many counters are to-day built with glass guards, especially in butcher shops, which prevent the scale from being shoved clear to the front of the counter because of interference of the guard and pedestal. With this arrangement of levers a considerable part of the length of the base can be set to the rear of the pedestal and hence slipped in under such a construction on the counter.

The remaining mechanism needs no special description as nothing new is claimed for it. The rear apex-like end of the A-like drum-actuating lever has a pair of projecting knife blades 7 that engage in the bearings of the clevis 8. This clevis hooks into the hook end of the rod 9, which in turn hooks into the beam 10. The ends of this beam are bifurcated to receive the links 11 which are fastened to the spring v. The upper end of each spring is fastened to a plug insert 12 carried on the end of the screw 13, which is supported by the cross web 14. The link 11 is guided through the slot 15 in the lug 16 which projects from the spider d. An integral arm 17 branching off the spider carries a ball cage 18 which supports the drum shaft 19. The drum shaft 19 is provided with a pinion 20 driven by a rack 21 held in engagement with the pinion by the weighted arm 22. The bar 23 passes through the eye 24 on the beam 10 and at its end is bifurcated as at 25 to straddle the link l. A hub 26 is sleeved on to this bar 23 and is provided with a rack actuating arm 27 connecting with the rack. It will be understood that precisely the same parts are located at the other end of the drum, but are not shown.

What I claim is:

1. In a weighing scale, the combination of parallel levers pivotally supported at one end, a member connecting the ends of the levers, an actuating lever, a link or actuator between one of the parallel levers and the actuating lever, and means on one of the latter two levers for shifting the point of contact between the link and the lever in obedience to thermal changes.

2. In a weighing scale, the combination of a system of parallel levers pivotally supported at one end, a platform-supporting member connecting the levers at the opposite end, an actuating lever independent of the parallel levers, an actuator or link between one of the parallel levers and the actuating lever, and a thermostat on one of the levers to which the link is connected for shifting the point of application of the actuator with respect to the lever.

3. In a weighing scale, the combination of a system of parallel levers pivotally supported at one end, a member connecting the levers at the opposite end, an actuating lever independently supported, a buckling thermostat supported by one of the levers, and a link connected with one of the parallel levers adapted to actuate the actuating lever, the said link being connected with the buckling thermostat so that thermal changes shift the point of application of the link with respect to the lever.

4. In a weighing scale, the combination of a pair of parallel levers pivotally supported at one end, a platform-supporting member connecting the opposite ends of the levers, an actuating lever separately and pivotally supported, a link for connecting one of the parallel levers with the actuating lever, a slide supported on one of the levers for receiving the contact of the said link on the lever, and a thermostat on the lever for moving said slide in obedience to weather conditions.

5. In a weighing scale, the combination of a system of parallel levers pivotally supported at one end, a platform-carrying member connecting the opposite ends of the parallel levers, an actuating lever independently and pivotally supported, a link between one of the levers and the actuating levers, a slide for supporting the end of the link that makes connection with one of the levers, a thermostatic strip supported by the lever and which buckles in accordance with thermal changes, and a connection between the thermostatic strip and the slide whereby buckling of the thermostatic strip changes the point of application of the link to the lever.

6. In an automatic computing scale, the combination of a housing in the form of a hollow base with a hollow pedestal supported somewhat removed from the rear of the base, a pair of parallel levers pivotally supported in the base at the rear thereof, a platform-supporting member connecting the parallel levers at the front of the base, a separate actuating lever pivotally supported in the front of the base and extending to a point under the hollow pedestal, and an actuating link connecting one of the parallel levers with the said actuating lever.

7. In an automatic computing scale, the combination of a hollow base and a pedestal, the pedestal being located somewhat removed from the rear of the base and near the center, a pair of parallel levers pivotally supported in the rear of the base, a platform-supporting member connecting the parallel levers at the front of the base, an actuating lever of the third order pivotally supported at the front of the base and having its actuating end located underneath the hollow pedestal, and an actuating link connecting one of the parallel levers with an intermediate point on the said actuating lever.

8. In an automatic computing scale, the combination of a hollow base provided with a hollow pedestal located at a point removed from the rear of the base and near the center of the base, a pair of parallel levers pivotally supported at the rear of the base, a platform-supporting member connecting the free ends of the levers at the front of the base, an actuating lever pivotally supported at its front end at the front of the base, its rear swinging end being supported directly under the hollow pedestal, an actuating link connecting one of the parallel levers with an intermediate point of the said actuating lever, and means for shifting the point of application of this link upon the actuating lever.

In testimony whereof I affix my signature.

BERT W. KING.